July 29, 1952   J. MARCO   2,604,642
FOAM RUBBER MATTRESSES, CUSHIONS, SEATS, AND THE LIKE
Filed June 19, 1950
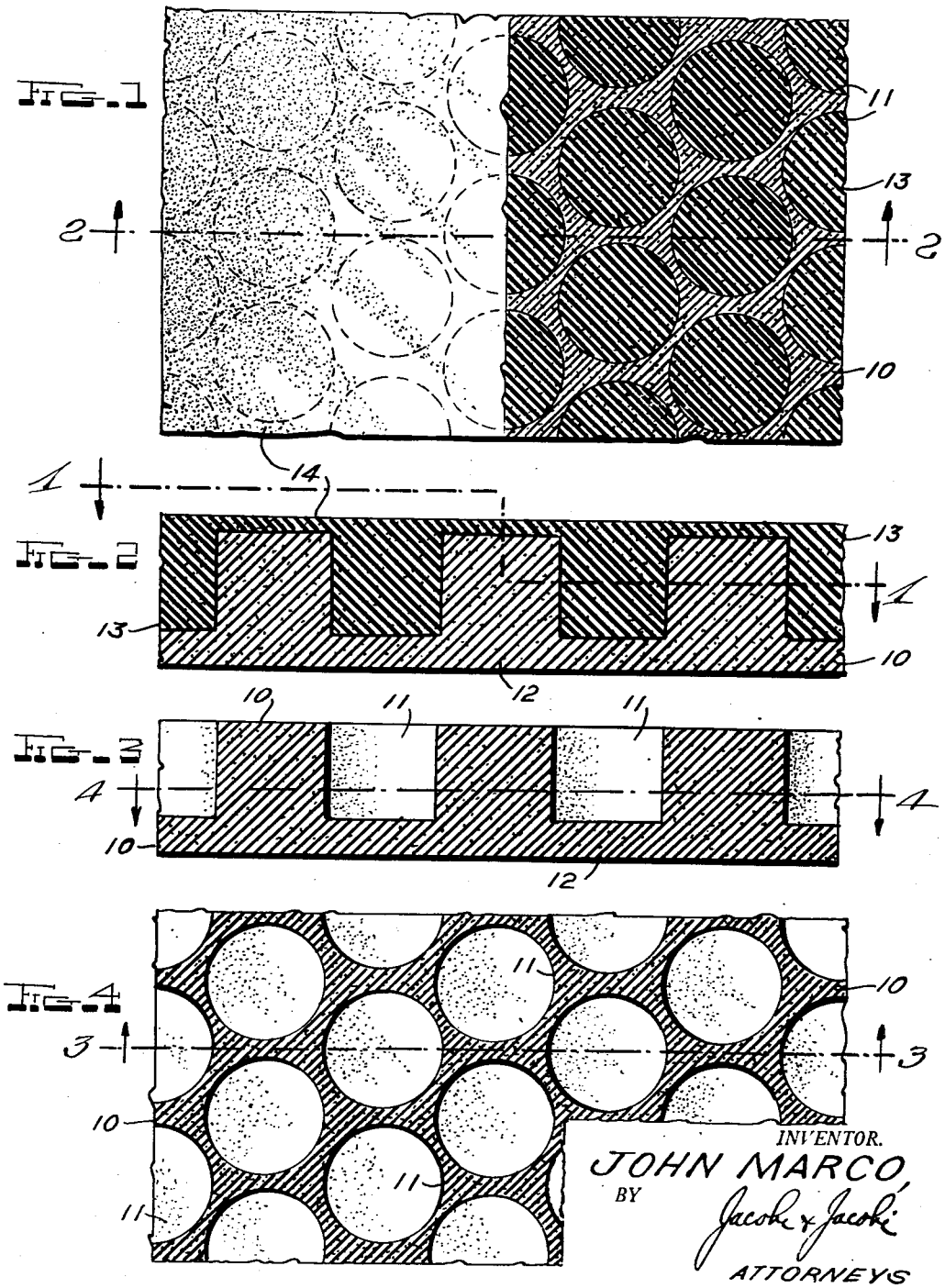

Patented July 29, 1952

2,604,642

UNITED STATES PATENT OFFICE 2,604,642

FOAM RUBBER MATTRESSES, CUSHIONS, SEATS, AND THE LIKE

John Marco, Wilmington, Del., assignor to Marco Company, Inc., Wilmington, Del., a corporation of Pennsylvania Application June 19, 1950, Serial No. 168,919

5 Claims. (Cl. 5—361)

This invention relates to bed mattresses and articles of a similar character for domestic or social use. More particularly it pertains to mattresses made of foam rubber and those in which coil springs are avoided.

In the usual construction of foam rubber mattresses the compound used is of a uniform character. This results in a mattress that is too erratic for comfort, as its resiliency is uncontrollable, by being either too much or too little. To avoid these objections this invention includes in its structure, a slab to be used as the resilient and main component of a mattress or cushion. Foam rubber is employed in this slab and is made of such rubber in variable degrees of resiliency, molded as separate units and then combined together to form a composite mattress of various compounds of foam rubber.

It is therefore an object of this invention to provide a new and improved foam rubber mattress or the like that will avoid some of the objections and limitations arising in previous forms of the same type of article.

Another object of the invention is to provide a new and improved foam rubber mattress that will be composed of foam rubber of varying densities and resiliencies to produce a cushioning effect that will meet particular requirements in a controllable manner.

A further object of the invention is to provide a new and improved foam rubber mattress that will have a structure made of plural foam rubber materials capable of producing structural differences in strengths and resiliency arranged segregatively, as cells and plugs, to suit personal comfort and needs.

Other objects will be indicated as the invention is outlined in more detail.

For a clearer comprehension of the invention and its objects reference is made to the accompanying drawings, which illustrate a particular form of the invention, while the claims indicate the scope thereof.

In the drawings:

Figure 1 is a plan view of a mattress of foam rubbers embodying this invention, part being sectioned on line 1—1 of Figure 2 to show the interior structure;

Figure 2 is a sectional elevation of line 2—2 of Figure 1;

Figure 3 is a sectional elevation on line 3—3 of Figure 4; and

Figure 4 is a plan view of Figure 3, showing the cellular construction of the main foam rubber frame used in this embodiment.

Similar parts are designated by the same reference numerals in all the figures.

In the construction shown, the mattress shown is made of a foam rubber frame 10 having a series of circular cells 11, formed into it for a definite depth so as to keep the lower portion 12 joined together as a slab. This foam rubber is of a selected resiliency and density, which for purposes of identification will be termed formula A. This formula is based on conventional ingredients and processing and is one of many known to the art, and therefore need not be included herein. For purposes of this description, it will be deemed to be of a relatively soft but resilient character. To render the mattress stronger and less susceptible to erratic maneuvering, which the softer foam rubbers are subject to, another foam rubber 13, of greater density and less resiliency is introduced into the cells in the form of latex of a formula B, and the two are vulcanized together, making a solid mass of foam rubber spotted with varying degrees of foam rubbers in its make up. The latex of formula B, is poured on in sufficient quantity to leave a layer 14 over the top of the original slab. This combines the two different foam rubbers into a composite one. Formula B is one of those known, selected for its greater stiffness when incorporated in the mattress. Likewise by providing other cells and varying the flowed-in latex, the resultant material can be given different characteristics of resiliency. This is accomplished without losing the strength of the material.

The action of different foam rubbers is peculiar in that it combines the resiliency of one type with another and at the same time creates an intermediate one. The effect is lateral as well as vertical. The action is different from that of steel springs because the material is inherently soft whereas the metallic springs have a rigid characteristic and a certain amount of quick rebound not found in rubber.

It is of course appreciated that foam rubber can be duplicated by materials that are not of natural rubber and these are usually synthetic. It is therefore the intent of the terminology applied to foam rubber to include such materials, within the scope of the reference to the latter. The use of round or circular sectioned cells is arbitrary and has the advantages of being an adaptable design rather than an essential requirement for this type of mattress, and therefore the cells are not limited to such specific contours. The cylindrical cells however have manifest advantages and in particular enable an efficient use of material to be made.

Normally the material is covered by a fabric cover of conventional nature to make them conform with the environment in which they are apt to be used, and also take up wear and tear on the foam rubber material.

While but one form of the invention has been disclosed herein, it is not intended that the structure of the items involved shall be limited to this specific construction, as other forms could be made that would employ the same principles and come within the scope of the attached claims.

Having thus described the invention what is claimed is:

1. A mattress for domestic purposes comprising a primary slab of foam rubber of predetermined composition and resiliency including a plurality of transversely disposed depressions therein, a secondary slab of foam rubber composition of predetermined resiliency substantially different to that of the primary slab and including projections arranged to fit snugly into said depressions, said slabs being combined together to form a single mattress having a resiliency determined by the mean total effect of both slab resiliences.

2. A mattress for domestic purposes comprising a primary slab of foam rubber of predetermined resiliency and including a plurality of spaced cells arranged transversely therein and extending from one of its longitudinal faces, a secondary slab of predetermined resiliency substantially different to that of said primary slab, said secondary slab including a plurality of projections extending from one of its longitudinal faces and arranged to fit and integrally combine in said cells and form a laminated mattress having a resiliency modified by the proportionate effect of combining of the resiliency of said slabs when they are integrally joined together.

3. A mattress for domestic purposes comprising a primary slab of foam rubber of predetermined resiliency and including a plurality of spaced cells arranged transversely therein and extending from one of its longitudinally faces, a secondary slab of predetermined resiliency substantially different to that of said primary slab said secondary slab including a plurality of projections extending from one of its longitudinal faces and arranged to fit and integrally combine in said cells and form a laminated mattress having a resiliency modified by the proportionate effect of the combining of the resiliency of said slabs when they are integrally joined together said cells and projections being of cylindrical form and regularly and equally spaced at the faces of said slabs brought together at joining flat against each other.

4. A mattress of the domestic type comprising in combination a primary slab of foam-rubber-like material including a series of transversely disposed depressions extending from one of its surfaces into the body of the slab, a secondary slab of similar material including projections thereon arranged for registry with said depression and placement therein so as to fit closely therein and lock both slabs quasi-integrally together, the resiliency of the primary slab being of predetermined degree while that of the secondary slab is of another predetermined degree, whereby the resulting resiliency of the both slabs when combined to form the mattress will be of a degree proportioned between the degrees of resiliency of both slabs.

5. A mattress of the domestic type comprising in combination a primary slab of foam-rubber-like material including a series of transversely disposed depressions extending from one of its surfaces into the body of the slab, a secondary slab of similar material including projections thereon arranged for registry with said depressions and placement therein so as to fit closely therein and lock both slabs quasi-integrally together, the resiliency of the primary slab being of predetermined degree while that of the secondary slab is of another predetermined degree, whereby the resulting resiliency of the both slabs when combined to form the mattress will be of a degree proportioned between the degrees of resiliency of both slabs to form a honeycombed mattress, the depressions and projections forming the middle portion of the mattress and layers of the slabs being formed by the outer portions thereof to conceal and enclose the projections and depressions between them with the outer surfaces of the slabs being flat.

JOHN MARCO.

REFERENCES CITED

The following references are of record in the file of this patent:

UNITED STATES PATENTS

| Number | Name | Date |
| --- | --- | --- |
| 2,192,601 | Mattison | Mar. 5, 1940 |
| 2,199,006 | Minor | Apr. 30, 1940 |